United States Patent [19]

Geppert

[11] Patent Number: 4,877,127
[45] Date of Patent: Oct. 31, 1989

[54] FRAME FOR BAND CONVEYING DEVICES

[76] Inventor: Helmut Geppert, Niederfeld 12, D-5162 Niederzier-Krauthausen, Fed. Rep. of Germany

[21] Appl. No.: 210,178

[22] Filed: Jun. 20, 1988

Related U.S. Application Data

[63] Continuation of Ser. No. 803,410, filed as PCT EP85/00082 on Mar. 6, 1985, published as WO85/04154 on Sep. 26, 1985, abandoned.

[30] Foreign Application Priority Data

Mar. 13, 1984 [DE] Fed. Rep. of Germany ....... 3409160

[51] Int. Cl.$^4$ .............................................. B65G 21/00
[52] U.S. Cl. ................................................... 198/860.3
[58] Field of Search ................ 198/860.1, 860.2, 860.3, 198/841, 837, 735

[56] References Cited

U.S. PATENT DOCUMENTS

| | | | |
|---|---|---|---|
| 871,381 | 11/1907 | Wenzelmann | 198/860.3 |
| 1,204,461 | 11/1916 | Law | 198/860.1 |
| 1,854,560 | 4/1932 | Owens et al. | 198/860.3 |
| 2,523,829 | 9/1950 | Hubbell | 198/346 |
| 2,951,579 | 9/1960 | Stauth et al. | 198/735 |
| 3,120,303 | 2/1964 | Leonard | 198/841 X |
| 4,172,677 | 10/1979 | Gunti | 403/189 |
| 4,534,461 | 8/1985 | Silverthorn et al. | 198/860.2 X |

FOREIGN PATENT DOCUMENTS

| | | | |
|---|---|---|---|
| 1264320 | 3/1968 | Fed. Rep. of Germany | 198/860.1 |
| 2242662 | 3/1974 | Fed. Rep. of Germany | |
| 3141510 | 5/1983 | Fed. Rep. of Germany | |
| 2446783 | 8/1980 | France | 198/860.1 |
| 636168 | 4/1950 | United Kingdom | 198/860.1 |
| 636169 | 4/1950 | United Kingdom | 198/637 |
| 891411 | 3/1962 | United Kingdom | |

Primary Examiner—Robert J. Spar
Assistant Examiner—Cheryl L. Gastineau
Attorney, Agent, or Firm—Grimes & Battersby

[57] ABSTRACT

There is provided, for the improvement of single part inventory and shipment as well as easing the handling in the production and/or assembly of a frame for band conveying devices, the frame formed from longitudinal beams held together by cross beams. The longitudinal beams of which in each case are formed as sections open towards the conveying device with outer web and top web extending away from its upper end, with as few single parts as possible and without cost-intensive connection elements and which have adequate load-bearing capacity yet provide significant weight reduction simply, quickly and conveniently in the manufacturing plant for delivery ready assembled or at the site of use despite universality to a very large extent with regard to the most widely differing conveying width and length and different load-bearing capacity properties from sections of the simplest possible, and accordingly most inexpensive cross-sectional contouring. The longitudinal beam sections possess according to the invention in each case at the free end of their top web a connection flange extending away downwards and both longitudinal beam sections are connected with one another by a distance piece formed as a U or a C section. The two side or edge webs of the distance piece away from its central web approximately complementarily to the adjoining longitudinal beam section connection flange are in each case connected with this.

11 Claims, 1 Drawing Sheet

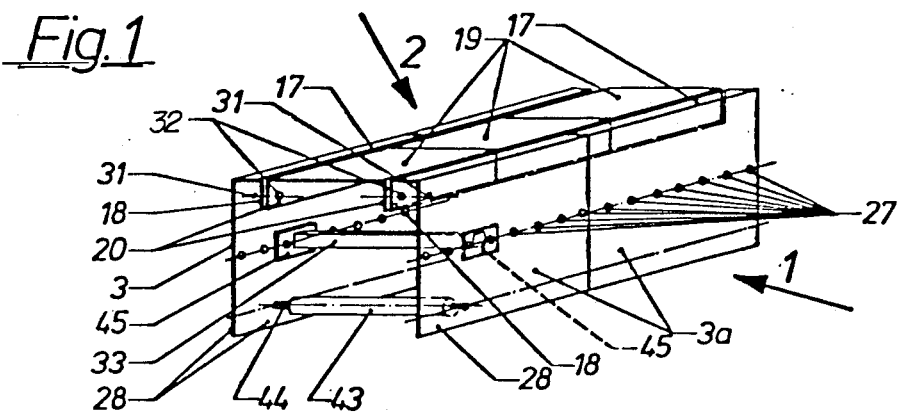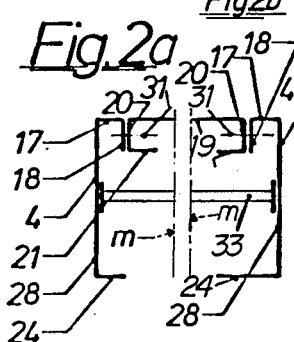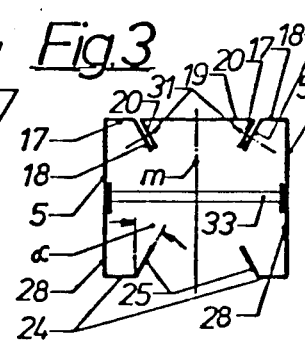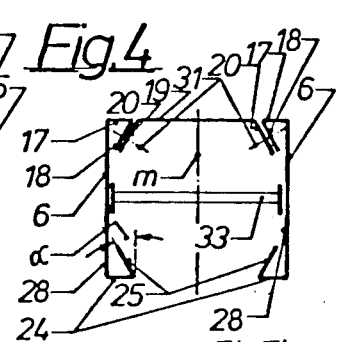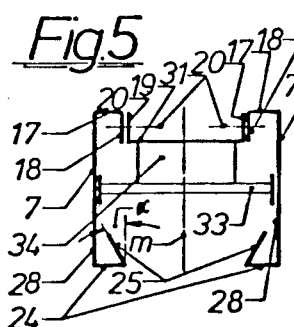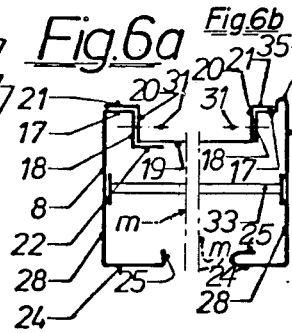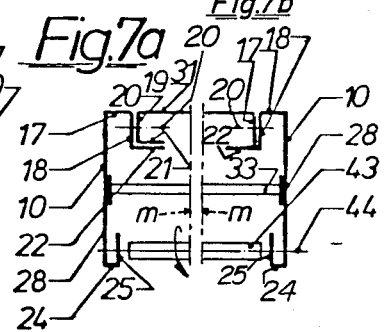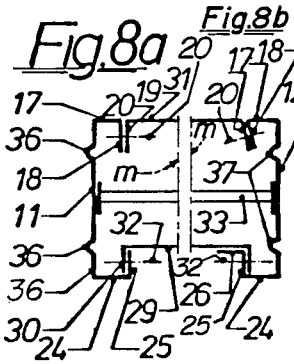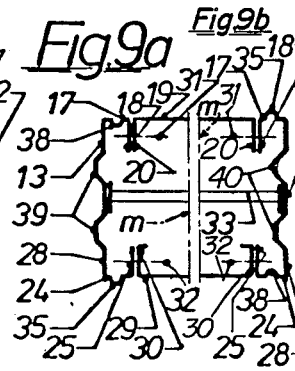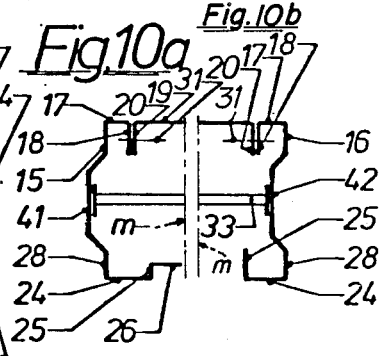

FRAME FOR BAND CONVEYING DEVICES

This application is a continuation of application Ser. No. 803,410, filed as PCT EP85/00082 on Mar. 6, 1985, published as WO85/04154 on Sep. 26, 1985, now abandoned.

This invention refers to frames for band conveying devices and in particular a frame for band conveying devices formed from longitudinal beams held together by cross beams bolted to them, the longitudinal beams are formed in each case as open sections in the direction of the conveying means with an outer web and a cover web extending away from its upper end.

Known frame structures possess as longitudinal beam sections U or C sections which are arranged so that their bottom webs lay between two side webs and form the outer webs of the frame and in each case a side web of these sections covers over a cover web the joining connections of the cross beams keeping the longitudinal beam sections at a distance, so that a distance is formed between the two longitudinal beam sections. In the case of frames for plate conveyors or hinged load-supporting element conveyors, a sliding strip is usually bolted onto the cover web, in order to support the side regions of the plate or hinged load supporting element band sliding on it. Z-shaped sliding strips of plastic material, which rest with one of their outer shanks in each case on a cover web of the associated longitudinal beam section and are bolted with these in the region of their front ends limiting their length, are also known. Furthermore in the case of plate or hinged load supporting element bands, holding a sliding shell placed loosely in the intermediate space between the two longitudinal beam sections in that the said sliding shell is formed as U section with side webs offset outwards and rests with its lateral offset regions in each case on the associated cover web of the adjoining longitudinal beam section is also known.

It is obvious that in the case of such designs, the frame structure must be formed solely by dimensioning the longitudinal beam sections and the cross beams so that they are capable of supporting without distortion not only the weight of the conveying means of the belt conveying device, which in the case of a plate or hinged load supporting element band chain can be considerable, but also the weight of the two deflector stations for the conveying means and if necessary of an additional separate drive station and in particular also the weight of the conveyed product. Especially under the aspect of sufficient resistance moment against bending and torsion of the frame structure under loading, sectional cross-sections must be selected in this case which provide for the entire frame structure adequate load bearing capacity and bending and torsional stiffness. However, a considerble weight of the frame structure is caused by this, which also determines essentially the manufacturing cost of the entire band conveying device.

In the case of band conveyors with elastically flexible conveying means, there are arranged between the opposite longitudinal beam sections of the frame a multitude of supporting rolls or rollers or pulleys arranged on axles held loosely in relation to the said longitudinal beam sections, on which the upper strand runs supported by them. If it depends upon whether such a flexible conveying means is to be supported over its entire area, then the entire frame structure of the type described has been covered with a sliding plate covering over the cover webs of both opposite longitudinal beam sections and resting on these, which is bolted along its outer edges associated with the longitudinal beam sections to the sections, in order to be secured against relative displacements from the longitudinal beam sections.

Obviously in these designs used in band conveying devices with elastically flexible conveying means the same unfavorable conditions with regard to production of the necessary load bearing capacity at simultaneously adequate bending and torsional stiffness also prevail as described previously for designs with plate or hinged load bearing element band as conveying means. Namely, not even in the last described version is the covering plate, serving as apron plate, able to contribute to the stiffness of the frame structure, since its fastening bolts serve solely to secure it against displacement in relation to the longitudinal beams of the frame, and on the other hand neither have nor can have a bonding effect between covering plate and longitudinal beam sections, especially as the covering plate definitely still possesses the degree of freedom to bulge or to warp under unfavorable loading conditions or in the case of not careful matching of its bolt hole to those of the longitudinal beam sections in the direction normal to their cover webs.

The invention is thus based on the object of creating with simple and inexpensive means while avoiding the disadvantages of known frame structures a possibility of being able to produce particularly rationally a frame of the appropriate type from as few individual parts as possible and in particular dispensing with connecting elements shown by experience always to be cost-intensive, such as for example connecting bridges or joining brackets, simply, quickly and conveniently either in the manufacturing plant for ready assembled delivery or else at the site of use, this being in addition also of sectional parts of the simplest possible and correspondingly most inexpensive cross section contouring, whereby further in the interest of an improvement in the stock keeping and in the shipment of these individual parts as well as simplifying the handling of the same in production and/or assembly, despite adequate load bearing capacity and bending and torsional stiffness, a significant reduction in weight should be possible and a universality previously not considered achievable with regard to the production of very different band conveying devices with widely differing conveying widths and lengths and accordingly also different load bearing capacity properties should be guaranteed by the use essentially of standardized individual parts with the corresponding advantages with regard to stock keeping of the individual parts, assembly of the same into the frame structure required in the individual application and if necessary disassembly or conversion with the desired consequences for the reduction in the manufacturing cost based on this.

This is achieved by the invention in a surprisingly simple and economical manner in that in a frame for band conveyor devices formed from longitudinal beams held together by cross beams bolted to them, the longitudinal beams are formed as sections open in the direction of the conveying means with an outer web and a cover web extending away from its upper end. The longitudinal beam sections possess in each case at the free end of their cover web a connection flange extending away from this downwards and the two longitudinal beam sections are connected with one another by means of a distance piece or skid plate formed a U or C section, the two side and/or edge webs of which, extending from its central web approximately complementarily to the connection flange of the adjoining longitudinal beam section, are in each case connected with the said longitudinal beam profile.

It is apparent that because of the use of a distance piece formed specifically according to the invention in association with the type of connection of the same provided for by the invention with the frame longitudinal beam profiles there results a composite component stiffened by the cross-beams which with comparably equal cross section formation with regard to cross section contouring and/or area possesses a load bearing capacity and bending and torsional stiffness increased many times over compared with known frame designs and in the case of design for the same resistance capacity against the loadings occurring can possess a considerably smaller material cross section of the longitudinal beam sections in comparison to such conventional frame designs, which as is known also determines significantly the weight of the frame structure and thus also the manufacturing cost of the entire band conveying device. In this case within the scope of the invention the entire frame design can be executed either as an open design, also designated as half box section, or else as a closed design also designated as full box section. In this case experience has in general shown that for most of the requirements, the measure according to the invention of using a distance piece connected with the two longitudinal beam sections in addition to the frames of conventional design formed of longitudinal beam section and cross beams connecting these with one another in no way needs to result in a larger total weight compared with the total weight of conventional frame designs but rather savings in the total weight of the frame structure according to the invention can frequently occur with the same stability properties against applied loadings in comparison to conventional frame designs. Except for the distance piece and possibly required screw elements for its connection to the adjoining longitudinal beam sections, which are available everywhere inexpensively as standard parts, such a frame according to the invention can be assembled simply, quickly and conveniently without other aids or additional parts, such as possibly supporting bridges or connecting brackets or the like and in case of need, for example for the purpose of converting to another application, such as possibly insertion in a conveying line of greater conveying width, it can be disassembled. After replacement of some functional individual parts of the band conveying device, such as for example the conveying means and the deflector rollers for this and if necessary also an additional drive roller, it can be assembled again.

Further the invention offers obviously the desired possibility of being able to influence the manufacturing costs of band conveying devices of different design in particular with regard to their conveying width and/or length favorably in that longitudinal beam sections of the frames of the same type can be produced for all versions and kept in stock, and solely distance pieces matched to the respective conveyor design need to be provided naturally in the same manner as previously customary, different cross beams must also be provided for different conveying widths.

A further development of the invention, the side webs of the distance piece and the associated connection flange of the adjoining longitudinal beam profile can in each case be connected force-locking and/or shape-locking with one another. In this case force-locking or force-locking and simultaneously shape-locking joining of these components is always recommended if the frame structure is produced in the manufacturing plant for ready delivery to the site of setting up or use, while pure shape-locking joints of these components opens up the possibility of such production of the frame structure or else the assembly of the same only at the site of use. In the case of pure force-locking joining of the distance piece with its two adjoining longitudinal beam sections it can be of advantage if the side webs of the distance piece and the associated connection flange of the adjoining longitudinal beam section are in each case cemented with one another. For application in which apart from force-locking joining shape-locking joining is desired at the same time, for instance, for safety reasons, it can be recommended that the side webs of the distance piece and the associated connection flange of the adjoining longitudinal beam section possess a locating device consisting of a depression or recess preferably symmetrical about the central point or central line and a protusion complementary to this in the other component and both components are cemented with one another, whereby according to design expediency the depression or recess in the side web of the distance piece or in the connection flange of the adjoining longitudinal beam section associated with this and the protrusion in the other component engaging in this, i.e. in the connection flange of the associated longitudinal beam profile, or in reverse in the side web of the distance piece can be provided, whereby the depression or recess is arranged in the associated connection flange of the adjoining longitudinal beam section.

It has become apparent as particularly worthy of recommendation for pure shape-locking connection of opposite longitudinal beam sections and the distance piece arranged between these, if at least one row of through bores or threaded holes at a regular distance to one another is provided in the connecting flange of each single longitudinal beam profile and at least one row of through bores or of threaded holes complementary to through bores of the associated connection flange of the adjoining longitudinal beam section is provided in grid-like arrangement in each side web of the distance piece and adjoining longitudinal beam section connection flanges and distance piece side webs are bolted with one another by means of screw elements in complementary through bores or threaded holes engaging in these or penetrating through these respectively. This design namely facilitates a not only extremely inexpensive version of a frame for band conveying devices because it uses practically only inexpensive standard parts obtainable in the market but also a design which can be assembled and disassembled at any desired site particularly simply, quickly and conveniently.

Should it be expedient for reasons of achieving a suitable moment of resistance of the sections participating in the frame structure according to the invention, the longitudinal beam sections can possess in each case at the free end of their top web a connection flange extending with inclination to the central longitudinal plane of the conveying device normal to the plane of the conveying means, whereby the said connection flange can extend with its free end to this central longitudinal plane of the band conveying device or else away from this. Correspondingly, the distance piece according to the concept of the invention is then formed so that its side webs run complementarily to the connection flanges of the adjacent longitudinal beam sections. However, it shall be preferable for most applications if according to an alternative development of the invention, the longitudinal beam sections possess in each case at the free end of their cover web a connection flange extending approximately parallel to the central longitudinal plane of the band conveying device normal to the plane of the conveying means. Moreover, this basic idea of the invention is accompanied by the advantageous possibility of being able to use the same longitudinal beam section for the most different frame designs, which is of particular benefit to the universality aimed for.

Although according to the concept of the invention it is in not necessary that the central piece must take up a specific position with regard to height for the purpose of achieving a particularly stable frame structure, it has proven itself as to be preferred for the overwhelming number of applications that the distance piece is arranged with central web in alignment with the top webs of the two longitudinal beam sections and with side webs extending away from the said central web downwards. It has been shown that in such a design, on one hand a flow of force particularly favorable for the stability of the entire frame structure is set up in its individual sectional regions and on the other hand there also results still the advantageous possibility of the direct supporting or bracing of the conveying means over a particularly large area of its width, and indeed usually even of its entire width, which in turn opens up possibilities for relatively light design of the conveying means, because it is dimensioned not for deflection but practically solely for tension, for example an elastically deformable conveyor belt. In this case it is immaterial with the exception of a possible improvement in the moment of resistance of the entire frame structure against distortion loadings, if in such a design the central piece is executed as a U section or else as a C section. For band conveyor devices with conveying means in the shape of a plate or hinged load supporting element band, an alternative design has proven itself. In this design the distance piece is formed as U section and is arranged with its central web lying deeper in relation to the cover webs of the two longitudinal beam sections and with its side webs extending away from the said central web upwards. Despite the advantages achieved by the invention, this design opens up precisely for plate or hinged load supporting element band conveyors the required running space for the pivots or hinges of the plates or supporting pieces of such a conveyor between the two longitudinal beam sections, whereby in addition this running space is also still protected by the specific shaping of the distance piece against access from the outside and, at the same time, forms a conveyor trough for particles of the conveyed product possibly occurring during the conveying process, such as for example fragments or the like or else other impurities which are carried out in the conveying direction by the pivots or hinges now acting as conveying members of a scraper conveyor and can be removed as waste.

A further development of this basic idea of the invention, the distance piece can further possess a supporting flange extending parallel to the cover web of the adjoining longitudinal beam section at the free end of each of its side webs, whereby the said suporting flange can further possess a width covering over more than one half of the width of the associated top web of the adjoining longitudinal beam section. In this manner not only the guide trough for the pivots or hinges of the plate of the hinged loadbearing element band is produced with a single section namely the distance piece section alone, but at the same time a guideway free of interruptions of the side edge region of the same over not only relatively large area, but, if the width of the supporting flange of the distance piece corresponds to the width of the cover flange of the longitudinal beam sections, even over the maximum width which even can correspond to the maximum widh of the frame of the band conveying device and, in the extreme case, can even extend beyond this, should this be required at any time.

In a further development of the invention, the longitudinal beam profiles can according to a basic idea of the invention be formed in each case as a U section with differing long side webs and arranged with their central web forming the top web and with their short side web forming the connection flange, so that their longer side web in each case forms the outer web or the side wall of the frame. Such a design has the advantage that despite adequate distortion stiffness of the frame, its interior is accessible from the underside while its upper side is closed and protects the interior of the frame from, for example, waste, conveyed product, fragments of the same or other foreign bodies or the like falling in, without any restrictions at all with regard to the constructional design of the upper side of the frame. This has proven itself as particularly advantageous in applications in which it is a case of fastening simply and quickly to the band conveyor device additional units, which are required during conveying, such as, for example, metal detectors or the like and which are easily dismantleable from the frame in working position.

On the other hand it can be expedient in particular for reasons of obtaining sufficient deformation stiffness of the frame with reduced sectional wall thickness, if in a further development of this basic idea of the invention, the longitudinal beam sections possess in each case at the free end of their longer side web an edge flange extending away from the said side web in the direction of the central longitudinal plane of the band conveying device normal to the plane of the conveying means. This obviously produces an increase in the moment of resistance of the longitudinal beam section cross-section and thus an improvement in the deformation stiffness with the possibility of a corresponding savings in weight by reduction in cross section over the entire sectional area. In this case the edge flange can possess a width overlapping the intermediate space between the inside of the outer web of the longitudinal beam section supporting the said edge flange and the adjoining end of a supporting roller or pulley, should the conveying device by equipped with a row of the same, or with a supporting girder for the lower strand of the conveying means or it can possess a smaller width in comparison to this intermediate space. In the first case the edge flange can be used as a safety element against unauthorized access to the moving parts arranged inside the frame and in this way it can make unnecessary other corresponding measures which are expensive in cost and assembly. In the latter case a safety effect satisfying most requirements can be achieved with adequate deformation stiffness, since according to experience in most band conveying device designs it is adequate if the longitudinal beam regions of the frame close to the outer web of the frame interior are secured against unauthorized access.

For further improvement in the stability of the frame according to the invention against deformations with the possibility of corresponding cross section and weight reduction of the longitudinal beam sections, the longitudinal beam sections can according to the invention possess in each case at the free end of their edge flange a stiffening flange extending in the direction of the cover web. This can extend with inclination in relation to the central longitudinal plane of the band conveying device normal to the plane of the conveying means and in this case with inclination diverging or converging upwards in relation to this central longitudinal plane, whereby the angle of inclination can amount to around 30° in relation to this central longitudinal plane, while on the other hand the stiffening flange can also extend approximately parallel to this central longitudinal plane of the band conveying device. This development of the invention makes it possible to be able to use with advantage longitudinal beam sections existing for the production of frame structures of conventional design also for the production of frame versions according to the invention and to have to provide for this solely a central piece design for each case adapted. In this case it is a particular advantage that, for a prescribed or desired load bearing capacity of the frame structure, existing sectional material which would be completely unsuitable for using for the production of conventional frame structures for load bearing capacities or deformation stiffnesses of comparable size, can find application for the longitudinal beam profiles.

In a further development, the stiffening flanges of both longitudinal beam sections can at the same time also be made used for still another task, in that they possess in arrangement in alignment with one another at least one row of through bores arranged in regular spacing to one another and/or a row to the free edge of the respective stiffening flange of open accepting slots for axles of pressure or guide rollers or pulleys, shafts of additional units, connecting elements to the connection components or the like. It is therefore, in addition to the desired stiffening function of the respective longitudinal beam section, makes unnecessary other expensive connection or positioning structures for the further components of the band conveying device required or attachments of the same, in that it takes over as well these functions itself.

So far frame designs according to the invention have been considered with frame interiors basically open from the direction of their underside. However, even if the edge flange of the longitudinal beam profiles should possess such a width that the entire frame width is overlapped by the two edge flanges extending to one another of the two opposite longitudinal beams sections, the concept of the invention can be pursued expediently for some applications still insofar as that according to another basic idea of the invention a side web of a bottom part formed as U or C section is connected force-locking and/or shape-locking in each case with the stiffening flanges of the longitudinal beam sections. In this case, the side webs of the bottom part and the associated stiffening flange of the adjoining longitudinal beam section can possess in each case at least one locating device of both components consisting of a depression or recess in one component preferably symmetrical to the central point or to the central line and a protrusion complementary to this in the other component. Since it shall be desired in most applications that the interior of the frame is accessible from below for the performance of assembly or adjusting work in particular to the moving parts of the band conveying device, it has proven itself as to be preferred in particular if according to an alternative at least one row of through bores or threaded holes is provided at a regular distance from one another in the stiffening flange of each longitudinal beam profile, and at least one row of through bores or of threaded holes provided complementarily to through bores of the associated stiffening flange of the adjoining longitudinal beam profile is provided in grid like arrangement in each side web of the bottom part, and adjoining longitudinal beam profile stiffening flanges and bottom part side webs are bolted to one another by means of screw elements in complementary through bores or threaded holes engaging into these or penetrating through these.

A particularly expedient form of this basic idea of the invention results with the bottom part formed as U section in that this is arranged with its central web lying on the free lateral edges of the stiffening flanges of the two longitudinal beam sections and with its side webs gripping behind these. In this way the fastening connection of bottom part and adjoining longitudinal beam sections can be improved without special additional measures in that this can act as if it is loaded by compression and not be tension irrespective of whether it is executed as force-locking or else as shape-locking connection. It is true that within the scope of the invention the possibility is also offered of arranging the bottom part with its two side webs lying between the outsides of the stiffening flanges of the two longitudinal beam sections, whereby the fastening connection, for example the screw elements used for this, are loaded under tension and therefore normally have to be dimensioned larger than would be necessary for compression or crushing loading. However, this last described version is frequently accompanied by the advantage of faster and simpler accessibility of the interior of the frame in the case of need, since after loosening the fastening connection in the case of this design, the bottom part quite simply falls out downwards.

An unexpected increase in the load bearing capacity and stability of the frame according to the invention against both bending and torsional loadings has resulted both in the case of designs with and also such without bottom part, if according to another basic idea of the invention the joints between the connection flange of a longitudinal beam section and associated side web of the distance piece and/or between the stiffening flange of a longitudinal beam section and associated side web of a possibly provided bottom part, are impressed by slight divergence of connection flange and central piece-side web or stiffening flange and bottom part-side web in the direction of their free edges to an initial stress directed towards loosening these connections. With correct assessment of this initial stress and corresponding selection of the size of the divergence of the two components to be joined with one another in each case, a further reduction in the profile cross-section dimensions can surprisingly also be achieved in this way with corresponding advantageous saving in weight in the manner described at the beginning.

According to another basic idea of the inention, the connection flange of each longitudinal beam section can expediently possess a mating area offset in the direction of the central longitudinal plane of the band conveying device normal to the plane of the conveying means on which in the case of design of the distance piece as a U section the associated side web of the same and in the case of design of the distance piece as a C section the edge web of the distance piece extending the associated side web in the direction of this central longitudinal plane of the band conveying device rests. In this way despite at least the same size of the profile cross sections coming into use, if not a size offering the possibility of a further reduction in the section wall thickness with corresponding weight reduction, a further increase in the deformation stiffness of the frame structure according to the invention can be achieved extremely simply and economically. For the last described case of the use of a distance piece formed as a C section, attention must be drawn to the fact that then at least the mating area of the connection flange of the longitudinal beam profiles should expediently be joined, this being force-locking and/or shape-locking, with the applied edge web of the distance piece, but preferably also in each case the central area of the connection flanges of the longitudinal beam sections should be joined in each case with the associated side web of the distance piece.

The longitudinal beam sections can within the scope of the invention be formed expediently both as bent and/or punched press parts of sheet or plastic material, for example also glass fiber strengthened plastic (GFK), with or without where necessary intermediate or subsequent deep drawing operation or they can be formed by extrusion or drawn sections preferably of metal but for small conveyors in particular also of suitable plastic material. True to the objective of the invention, the longitudinal beam sections coming into use for the frames according to the invention can at the same time also be made useful for still further tasks, in that according to another basic idea of the invention at least one of the longitudinal beam sections possesses in the region of its longer side web at least one approximately pot-like indentation in the interior of the section or protrusion out from this with approximately circular edge contour and preferably a center point hole or with approximately elliptical edge contour and preferably at least two holes arranged on the longer axis of the same or with a slot-type elongated hole extending on both sides of the same, preferably placed symmetrically to this. In this way not only can desired increases in the deformation stiffness be achieved at places of possibly expected increased deformation loadings of the longitudinal beam sections without enlarging the size of the section material and thus the weight of the same, but the possibility is also offered at the same time of accomodating bearings, couplings or other required or desired mechanical elements in more or less covered position and thus protected against unauthorized or inadvertent access and correspondingly promoting occupational safety in the interior of the section area of the longitudinal beams of the frame.

The same is also possible according to an alternative to this basic idea of the invention, according to which at least one of the longitudinal beam sections possesses at least one approximately trough-like indentation running in the direction of its longitudinal axis into the inside of the section or protrusion running out from this with limited own length or with own length extending over the entire length of the longitudinal beam section. This design offers the additional advantage that the arrangement of the mechanical elements or other components or the like to be accomodated in the depth area of the longitudinal beam section is variable within the extent of the length of the trough-like indentation or protrusion of the same, which by keeping in stock only a single type of section or a small number of different section designs can be of benefit with advantage to universality in regard to the variety of the frame structures which can be produced from these, whereby the rationalization possibilities in particular with regard to stock keeping of section material, cost prices for this and assembly costs can as shown by experience to be quite considerable.

In particular for reasons of good force flow conduction just as for special simplification of the manufacture of the sections, it has proven to be particularly expedient if in further development of this last described basic idea of the invention the indentation(s) or protrusion(s) possesses or possess oblique transition areas between a level central region and the adjoining regions of the longer side web of the longitudinal beam section. Further at least one row of through bores or threaded holes can be provided at a regular distance from one another with advantage in the level central region of the indentation or protrusion.

If required, according to a further basic idea of the invention, the longitudinal beam sections can possess at least one bead-like indentation or protrusion arranged along the longitudinal axis of the longitudinal beam section preferably symmetrical to the center point or central line in the region of their top web and/or of their outer web forming the side surface of the frame and/or of their lower edge flange. In this case the expert shall select the shape and arrangement according to the loads to be expected for the application in question, whereby it nevertheless should be realized that such stiffening beads can certainly also take over as well further operational functions of the band conveying device according to the invention such as for example when the top flanges of the longitudinal beam sections are equipped with line-shaped protrusions extending in the longitudinal direction of the same which then can serve at the same time as the edge limits for the upper strand of the conveying means guiding the course of the upper strand.

Furthermore it has proven to be particularly expedient for certain appications, because it makes possible the use of extremely thin-walled material for the distance piece, if according to another basic idea of the invention this is braced in its central region by at least one cross beam, preferably a number of cross beams arranged at a distance to one another in the longitudinal direction of the frame.

In the majority of applications, a design form according to the invention shall be adequate, in which the longitudinal beam sections are formed as a single part over practically the entire frame length. However, in particular based on requirements of the area of application of a band conveying device containing such frames according to the invention, other design forms of the invention can be recommended in which the longitudinal beam sections are formed in several parts over the length of the frame. In this case it has proven to be particularly expedient if the distance piece is formed as one part over practically the entire frame length and in this way serves as connecting element for adjoining part pieces of the multi part longitudinal beam section or alternatively to this it is also formed in several parts and part pieces of the same are arranged in each case overlapping as connection element a joint of adjoining part pieces of the multi part longitudinal beam sections. The invention is described more closely purely by way of example in the following by reference to some preferred design examples, which are shown diagramatically in the drawings. In this case:

FIG. 1 shows in graphical representation a design of a piece of a band conveying device frame according to the invention with components required for the function of a band conveying device and FIGS. 2 to 10 show in each case in diagramatic end view design examples of frame structures according to the invention.

1 is designated as the band conveying device of which a piece of its frame is designated as 2 as shown in FIG. 1. This is formed in the design example reproduced of several pairs of longitudinal beam section pieces 3a arranged behind one another in the frame longitudinal direction, of which only two are shown in FIG. 1. Cross beams 33 keep these at the desired or required distance as well as several distance pieces or skid plates 19 of adaptable width arranged behind one another in the frame longitudinal direction. The longitudinal beam sections 3 of the frame 2 are designed in the design example according to FIG. 1 in the most simple manner as U sections with side webs of different lengths, which are arranged so that in each case their longer side web 28 comes to lie as an outer web of the frame sructure approximately parallel to the central longitudinal plane of the frame 2, which lies normal to the plane of the conveying means, while in each case its shorter side web 18 approximately parallel to this longer side web 28 in the case of the U section 3 opens downwards and the top web 17 closing upwards lies facing the opposite longitudinal beam section 3. Approximately in the central region of the longer side web or shank 28 of the U shaped longitudinal beam sections 3, a row of through bores 27 is provided arranged at regular spacing, which among other things serve for accepting screw elements, which are not displayed by means of which the two longitudinal beam or U section 3 are bolted to cross beams keeping them at the desired or required distance to one another by means of their connection flanges 45. The intermediate space between the two shorter side webs 18 facing one another of the two longitudinal beam sections 3 is bridged over by a number of distance pieces 19. The width of a distance piece is selected complementary to the spacing of the longer side webs 28 of the longitudinal beam sections 3 determined by the cross beams 33 taking into account the width in each case of their top webs 17, and their side webs 20 are formed complementary to the associated side web 18 of the ajoining longitudinal beam section 3 in each case. In this case in this design example, the shorter side webs 18 of the longitudinal beam sections 3 serving as connection flanges and the side webs 20 of a distance piece 19 are connected by shape-locking with one another by screw elements 31 solely indicated by their dash-and-dot central line, which penetrate the through bores 32 provided in alignment with one another in both flanges or webs 18 or 20 which are to be joined to one another.

Since the frame longitudinal beams 3 are in each case formed from several section parts 3a, which is accompanied by the advantage of holding in stock standardized longitudinal beam section lengths and their use in suitable number and arrangement for the production of a desired frame length, the distance pieces 19 are used, in addition to their stiffening function, for the purpose of frame formation thereby serving as connecting elements between longitudinal beam section parts 3a. Further, they follow one another in the frame longitudinal direction in that they are of a smaller length in comparison to the length of same and are arranged overlapping two adjacent longitudinal beam section section parts 3a, as shown in FIG. 1 for the central one of the three distance pieces reproduced.

In general both the longer side webs 28, and, with advantage, also the shorter side webs 18 serving as connection flanges can be designed not parallel to one another but with a converging or diverging inclination to one another, whereby the distance pieces 19 have to possess complementarily offset or angled side webs 20. Furthermore, it must be emphasized that instead of the indicated shape-locking connection of distance pieces 19 and longitudinal beam sections 3 adjoining them on both sides in the shape of the screw connections 31 or in addition to these, a force-locking connection of the connection flanges 18 of the longitudinal beam sections 3 with the side webs 20 of the distance pieces 19 can also be provided for example by suitable cementing. Such a design can be recommended in particular for frame structures to be delivered readily assembled from the factory.

Irrespective of whether and in which manner this connection between distance pieces 19 and adjoining longitudinal beam sections 3 is formed, such as force-locking and/or shape-locking, a slight divergence of the shorter side webs or flanges 18 or side webs 20 to be joined with one another towards their free edges can be provided expediently. In this way an initial stress directed towards convergence of the free edges of the longer side webs 28 of this half-box section is provided to the half-box section of the frame structure which, because cross beams 33 are inserted between these side webs 28 determining the exact outer distance of the same, impress upon the connection flanges 18 and side webs 20 connected with one another an initial stress directed towards releasing this connection which on its part surprisingly provides to the entire half-box section formed in this way an increased bending and torsional stiffness.

In FIG. 1 a bearing supported pressure and/or guide roller 43 for the lower strand of the conveying means, which itself is not shown, if further supported with its axle 44 in a suitable conventional manner at the longer side webs 28 of the two longitudinal beam sections 3 situated opposite one another.

The same aspects apply for the further design versions of frames according to the invention indicated in FIG. 2 to FIG. 10, in which the same measures already described above can be realized individually or in combination with one another. The same details of the design versions concerned are in each case designated with the same reference symbols.

The design according to FIG. 2 differs from that according to FIG. 1 basically only in that the longitudinal beam sections here designated with 4 possess an end flange 24 extending from the free end of their longer side web 28. It is indicated on the left side in FIG. 2, i.e., FIG. 2a, that the edge flange can possess a relatively short length, which is selected according to the required deformation resistance properties of the longitudinal beam section and thereby preferably also so that it covers over at least the intermediate space between the inner surface of the longer side web 28 of the longitudinal beam section 4 and the adjoining front end of a possibly provided pressure and/or guide roller 43, while it is illustrated in FIG. 2b that the edge flange 24 can also possess a larger length, which in general can even go so far that the entire length of such a pressure of guide roller is covered protecting it from unauthorized access. And finally it is still also indicated in FIG. 2 that instead of a central piece 19 formed as U section, as shown in FIG. 1, a distance piece 19 designed as C section can also be used, if this is considered to be expedient for design engineering reasons or else because of selective utilization of material stocks present in the inventory.

The frame design according to FIG. 3 differs from that according to FIG. 2 in two different respects. On the one hand, as shown, the connection flange of the longitudinal beam sections designated here with 5 are designed with an inclination in relation to the central longitudinal plane m of the frame 2 normal to the plane of the not shown conveying means, for example of a conveyor belt, this being with an inclination running in towards the said central longitudinal plane or converging in relation to the corresponding connection flange 18 of the longitudinal beam section 5 situated opposite. The angle of inclination can in this case expediently amount to up to around 30° although steeper or flatter inclinations are also possible. As can be seen, the side webs 20 of the distance pieces 19 are contoured complementarily. Such a design can be expedient in particular with regard to simplification of the alignment of the distance pieces 19 in relation to the adjoining longitudinal beam sections 5 in the assembly of the frame 2. It is recognizable that the screw elements 31 here have an oblique axial arrangement, which in addition can also possess advantages with regard to assembly.

On the other hand the edge flanges 24 of the longitudinal beam sections 5 are bent up or offset upwards, this means into the interior of the frame, so that a stiffening flange 25 promoting improvement in the deformation stiffness of the entire frame structure results, which in addition, as shown, can be formed as a mirror image of the connection flange 18 of the longitudinal beam section 5 concerned so that this can find application both for right hand and for left hand attachment. But versions of stiffening flange 25 other than those shown in FIG. 3 are also possible, this being both with regard to the offset angle and/or shaping and/or length of the same.

The frame design according to FIG. 4 corresponds to that according to FIG. 3 with the modification that here the connection flanges 18 of the longitudinal beam sections designated here with 6 are designed diverging from the central longitudinal plane m of the frame 2 or away from the band conveying device 1 or towards the web 28 or in relation to the corresponding connection flange 18 of the longitudinal beam section 6 situated opposite towards its free edges and the stiffening flanges 25 in each case extending an edge flange 24 run in the same manner in the direction of the section web 28. Here the angle of inclination α in relation to the central longitudinal plane m amounts with advantage in this case to up to 30° and can be formed for the same reasons as in the design according to FIG. 3 edge flange 24 with stiffening flange 25 corresponding to the top web 17 with shorter side web 18 of the longitudinal beam section 6 in question. Obviously, here as well, the displayed distance piece 19 is adapted with regard to its side webs 20 to the shape of the associated connection flange 18 of the adjoining longitudinal beam section 6. Obviously, here as well, the arrangement of the screw elements 31 provided for the shape-locking connection is also oblique with respect to the axial direction.

In the frame design reproduced in FIG. 5, it is shown that the longitudinal beam sections designated here with 7 can also be formed asymmetrically in arbitrarily suitable manner, whereby this is shown taking for example a combination of a design of the region of the longitudinal beam section according to FIG. 1 situated above with a region according to FIG. 4 situated below to obtain the longitudinal beam section 7 according to FIG. 5. Furthermore it is shown in FIG. 5, purely by way of example, that a distance piece 19 formed as U section can also come into use in reverse arrangement compared with FIG. 1, in that it is shape-lockingly fastened with the section interior being upwards to the associated connection flanges 18 on the adjoining longitudinal beam section 7 for example by means of screw elements 31. In order to be able to design the distance piece 19 shown as section with extremely small wall thickness, without impairing its frame-forming function. This distance piece 19 can as shown in FIG. 5, be braced on its underside by the cross beam 33, in that it lies on top of an intermediate lining piece 34, which is attached to the cross beam 33. In addition, it is also possible to contribute in this way positively to simplifying the assembly, because of the front surface of the lining piece 34 forming the supporting surface for the distance piece 19, a predetermined height position for the distance piece 19 can be defined, whereby time consuming adjustment and alignment work in the assembly of the same can be dispensed with.

In this connection, attention must be drawn to the fact that such an arrangement of the distance piece 19 indeed excludes in no way its use in connection with elastically flexible conveying means, such as for example conveyor bands or conveyor belts. However, it is particularly suitable for use in connection with plate or hinged load-supporting element bands as conveying means, in that because of the open section interior of the distance piece 19 pointing upwards, a running channel for the pivots or hinges of such a conveying means is namely offered which is closed at the bottom and accordingly prevents undesired particles falling through, whereby in addition the channel so formed can also still serve with advantage as conveyor trough for the removal of foreign material getting into it, such as for example crumbs or fragments of conveyed piece goods transported on the conveying means.

The two frame designs which can be seen in FIG. 6 are also conceived in particular for conveying means in the shape of plate or hinged load-supporting element bands, but are not restricted to this type of application. In the design of a longitudinal beam section designated here with 9 reproduced in FIG. 6b, use is made of a section corresponding essentially to the longitudinal beam section 4 according to FIG. 2, which, however, is transformed to the extent that its top web 17 possesses a bead-like stiffening protrusion 35 in the region of its external edge and the edge flange 24 situated below possesses an edge folded over on itself for section stiffening just as for avoiding a sharp edge. The design of the distance piece 19 could be the same as in FIG. 5. However, another design is shown in which the side web 20 of the distance piece 19 possesses a supporting flange 21 offset outwards, with which it lies on the top web 17 of the adjacent longitudinal beam section 9 and is braced there, whereby the same advantages with regard to simplifying the assembly by avoiding expensive aligning and adjusting work are achieved as in a support by the cross beams 33 for example according to FIG. 5.

In the design shown in FIG. 6a, another bearing support of the distance piece 19 otherwise formed generally in the same manner as in the design according to FIG. 6b is selected in that the longitudinal beam sections designated here with 8 possess a side web 20 angled or offset to a mating area 22. As shown, in this case the distance piece 19 with its supporting flange 21 resting on the top web 17 of the adjoining longitudinal beam section 8 can brace itself in relation to this, whereby then the supporting flange 21 can lie hollow and solely has the function of a further improvement in the inherent stiffness of the frame structure and the connection between the distance piece 19 and the associated side web 18 of the adjoining longitudinal beam section 8 takes place shape-locking through screw elements 31 approximtely parallel to the central web. Or else, the mating areas 22 of the side webs 18 of the longitudinal beam sections 8 can also still serve as bearing supports for the distance piece 19, in that its side webs 20 are contoured with regard to height so that when its central web area lies on the mating areas 22 of the longitudinal beam sections 8, the supporting flanges 21 of the distance piece 19 lie hollow with regard to the top webs 17 of the associate longitudinal beam sections 8 and solely have a guide function for the side areas of the not shown conveying means lying on them. The fastening of distance piece 19 and adjoining longitudinal beams ections 8 can then take place either parallel to the central longitudinal plane and/or normal to the central longitudinal plane, as is indicated by the dash-and-dot lines 31.

In addition, the longitudinal beam section 8 according to FIG. 6 still possesses the special feature that its edge flange 24 lying at the bottom possesses only a very narrow stiffening flange, which is still approximately parallel to the central longitudinal plane, extending into the interior of the frame.

The frame design according to FIG. 7 corresponds basically to that according to FIG. 6a, in that the longitudinal beam sections designated here with 10 have practically the same cross sectional formation as the longitudinal beam sections 8 according to FIG. 6a. This occurs with the exception that the edge flanges 24 of the longitudinal beam sections 10 lying below are kept significantly shorter than with those of the longitudinal beam sections 8, in order to facilitate invervention of the stiffening flanges 25, which are bent or offset upwards or into the interior of the frame and lengthen the edge flanges on the edge side, into the space between the webs 28 of the two opposite longitudinal beam sections 10 with only a small distance to these webs 28. This has the purpose of also using the stiffening flanges 25 as bearing or supporting elements for the axles 44 indicated only diagramatically in FIG. 7 of pressure and/or guide rollers or pulleys 43, in that these stiffening flanges 25 possess mountings not shown in FIG. 7 for the axles 44 of the rollers or pulleys 43, for example in the shape of slot-like recesses opening towards their free edges pointing upwards, in which for the purpose of simplifying assembly the rollers or pulleys 43 with their axles 44 or their bearings only need to be suspended simply from above.

It is also indicated in FIG. 7, purely by way of example, that a distance piece 19 formed in a suitable manner as C section (FIG. 7a) or as U section (FIG. 7b) can be placed on the mating areas 22 of the connection flanges 18 of the longitudinal beam section 10. In this case in the same manner as already described previously in connection with the design according to FIG. 6a, the connection between distance piece 19 and adjoining longitudinal beam sections 10 can take place by suitable, preferably shape-locking connection of the side webs 22 of the distance piece 19 with the associated connection flange 18 of the adjoining longitudinal beam section 10, whereby in the case of a distance piece 19 formed as C section, a corresponding connection of the supporting flange 21 of the distance piece 19 with the mating area 22 of the connection flange 18 of the longitudinal beam section 10 concerned can be made, as indicated by the dash-and-dot lines in FIG. 7a.

It is shown in FIG. 7b that a distance piece 19 in U section design with section opening downwards, this means in the direction directed towards the cross beam 33, can also be supported on the mating area 22 of the connection flange 18 of the associated longitudinal beam section 10 and the frame forming connection of the components takes place through the flanges or webs 18 or 20, respectively, lying complementarily to one another, as indicated by the dash-and-dot lone 31.

The frame design according to FIG. 8 also basically corresponds to that according to FIG. 6a, whereby solely by way of example the possibility is indicated, of providing bead-like protrusions 36 of the section material in the side web 28 of the longitudinal beam section designated here with 11 if necessary for further section stiffening, whereby the representation of these protrusion or stiffening beads 36 in FIG 8a can imply both a design of the same symmetrical about the center point and a section through or a end view of a or some stiffening bead(s) with longitudinal extension stretching in the longitudinal direction of the frame and design correspondingly symmetrical about the central line and in this case the length of these stiffening beads 36 can be limited in the longitudinal direction of the frame or this can run through the entire length of the longitudinal beam section 11 concerned.

The frame design according to FIG. 8b corresponds essentially to that according to FIG. 4, this however with the modification that the side web 20 other than in FIG. 4 extends approximately parallel to the web 28 of the longitudinal beam section designated here with 12 and ends in an engaging area 26 bent or offset away in a direction from this. This serves on one hand for improving the deformation resistance properties of the entire frame structure. However, on the other hand it can also serve, as indicated in FIG. 8b, as support for a bottom part 29 formed as U section, which resting with its central web on the engaging area 26 of the stiffening flange 25 of the longitudinal beam section 12 can engage with its side web 30 behind the stiffening flange 25 of the longitudinal beam section 12. In this case, if it does not depend upon a frame-forming function of the bottom part 29, this then always needs only to be pushed loosely into the interior of the frame, without having a connection with the longitudinal beam sections situated opposite to one another. However on the other hand the bottom part 29 can also be used for improving the deformation stiffness of the frame structure, in order to exploit the possibility for further reduction of the material cross section of the other frame-forming components. In such a case to be connected with the stiffening flanges 25 of the longitudinal beam sections 11 or 12, while in addition a connection of the central web of the bottom part 29 with the engaging area 26 of the stiffening flange 25 of the longitudinal section 12 can be provided. In the design according to FIG. 8a, the stiffening flange 25 of the longitudinal beam section 11 possesses no extension by an engaging area, but the mounting and method of operation including the nature of the connection of bottom part 29 and stiffening flange 25 of the longitudinal beam section 11 are the same and correspond to the version according to FIG. 7b with regard to the connection of distance piece 19 and adjoining longitudinal beam section 10, since the access to the interior of the frame from below for assembly purposes and for inspection and maintenance reasons should remain preserved, a quickly detachable connection between bottom part 29 and adjoining longitudinal beam sections 11 or 12 is preferably provided, which can be formed shape-locking with advantage. The nature of the connections possibilities are indicated by dash-and-dot lines symbolizing screw elements 32 in the manner already described.

In addition, stiffening beads in the web 28 of the longitudinal beam section 12 in the shape of indentations 37 extending into the interior of the section are also shown in FIG. 8b. For these the same applies with regard to profiling and longitudinal extent as for the bead-like protrusions 36 of the design according to FIG. 8a.

The frame design according to FIG. 9 corresponds basically to that according to FIG 5, this however with the modification that other than in FIG. 5, the stiffening flange 25 lengthening the edge flange 24 situated below is not inclined in relation to the section web 28, but runs practically parallel to this. The longitudinal beam section designated with 13 reproduced in FIG. 9a can, as shown, possess a bead-like indentation extending into the interior of the section in its top web 17 and a bead-like protrusion 35 of the edge flange 24. However, the arrangement can also be reversed, as in the case of the longitudinal beam section shown in FIG. 9b and designated with 14, in that the top flange 17 of the same possesses a bead-like protrusion 35 and the edge flange 24 a bead-like indentation 38 into the interior of the section. In this case the same applies for the stiffening beads 35 or 38 with regard to profiling and longitudinal extent as already explained in relation to the stiffening beads 36 or 37 respectively according to FIG. 8. With regard to the design according to FIG. 9b, reference must be made to the fact that in particular in the case of the longitudinal extent of the bead-like protrusion 35 of the top web 17 of the longitudinal beam section 14, this can be used as side guide for the conveying means in the same manner as already explained for the stiffening bead 35 according to FIG. 6b. Still further, stiffening beads are also indicated in FIG. 9 in the case of the two longitudinal beam sections 13 and 14 respectively. Thus bead-like protrusions 39 of the web 28 of the longitudinal beam section 13 are provided above and below a level central area used for example for the fastening of the cross beam 33 and in the case of the longitudinal beam section 14, bead-like indentations 40 into the interior of the section are provided above and below the corresponding level central area of the section web 28 of the same, whereby these indentations 40 or protrusions 39 can be designed with advantage so that their transition areas to the areas of the section web 28 remaining in the main plane of the same possess oblique transition areas. The illustrations of the protrusions 39 and indentations 40 make plain that on one hand it can be a question of ring or pot-like deep drawn deformations concentric about the center point of the axis of the cross beam 33 or else of trough-like deformations extending in the longitudinal direction of the longitudinal beam section 13 or 14 according to manufacturing method of the same, which deformations in the latter case can also be produced in the case of limited length for example by deep drawing, but which when their length extends over the longitudinal beam section length can be produced with advantage by rolling or else in the course of the manufacture of the longitudinal beam section 13 or 14 itself by means, for example, of drawing or extrusion.

The nature of the arrangement of the distance piece 19 shown as U section and its connection with the adjoining longitudinal beam sections 13 to 14 corresponds to that according to FIG. 2. The nature of the arrangement of the bottom part 29 formed here as C section and its connection with the adjoining longitudinal beam sections corresponds to the arrangement and connection of the distance piece 19 according to FIG. 5 apart from the support by the cross beam 33 with the lining piece 34.

The frame design according to FIG. 10b corresponds basically to that according to FIG. 8a and the arrangement according to FIG. 10a to that according to FIG. 8b. In contrast to the longitudinal beam sections 11 or 12 respectively according to FIG. 8, the longitudinal beam sections in the design according to FIG. 10 designated with 15 or 16 respectively possess no smaller strengthening or stiffening beads 36 or 37 respectively. Rather in the case of the longitudinal beam section 15 according to FIG. 10a, the section web 28 of the same is dished out approximately in its central area to form a large area stiffening bead 41, while the reverse possibility of providing the section web 28 of the longitudinal beam section 16 with a large area indentation 42 into the interior of the section as stiffening bead is made plain in FIG. 10b. Here as well the protrusion 41 or the indentation 42 possess oblique transition areas from their level central area to the areas remaining in the main plane of the relevant section web 28. Here as well, the protrusion 41 or the indentation 42 shown can represent approximately pot or bowl shaped deformations of the material of the section web 28, the outline contour of which can run for example approximately symmetrical to the center point of the axis of the cross beam 33, but these stiffening beads 41 or 42 an also be deformations extending in the longitudinal direction of the frame of limited length or of length extending over the longitudinal beam section length. In this case in addition the longitudinal beam sections can be formed symmetrically both in the design according to FIG. 10a and in that according to FIG. 10b, this means that they possess an edge flange 24 situated below with width corresponding to the width of the top web 17. The possibilities for an arrangement of a bottom part are the same as in the designs according to FIG. 8 and 9, although no such bottom part 29 is shown in FIG. 10.

In addition, it must be emphasized that any stiffening beads to be provided both in design as indentation and as protrusion in no way need to possess one of the cross sectional contours shown, but rather according to the requirements of the individual application or loading case and the possibilities for manufacture of the section concerned, the expert may also select other designs of bead. However, not only the manufacture but also the use in assembly of the sections coming into use according to the invention is obviously particularly simple and correspondingly inexpensive; the same applies for the connections of the individual section parts to the frame structure according to the invention, which can be produced without interposition of additional components as connecting elements or the like force-locking alone by cementing for example or form-locking alone by using screw elements available on the market and correspondingly inexpensive.

In the FIGS. 1 to 4 and 7 to 10, arrangements of the distance pieces 19 are shown in each case in which their central web is in alignment with the associated top webs 17 of the adjoining frame longitudinal beam sections 3 to 6 and 10 to 16 respectively. This is indeed not absolutely necessary, insofar as the conveying means possess adequate inherent stiffness and stability in the transverse direction, but this arrangement in alignment has proven itself to be preferred in particular if in the interests of using a conveying means which is thin or soft as possible and accordingly lacking in self-supporting properties, a support for the entire cross section of its upper strand loaded with conveyed product should be offered to this.

Furthermore, attention must still be paid to the fact that for reasons of better clearness and lucidity the webs or flanges to be connected with one another in each case of the frame-forming components or sections are shown in each case running parallel to one another, but that they should diverge slightly in relation to one another with advantage in the direction of their free edges, so that when the connection of the flanges or webs concerned with one another is produced, in association with the cross beams 33 keeping the longitudinal beam sections 3 to 16 at the desired distance to one another, an initial stress is applied directed towards loosening the profile connections concerned or with other words the tendency is provided to the half or full box section thus formed to conduct in itself a prestressing force flow approximating to the largest possible extent to the force flow in a tube section. In this way a certain reduction in the section wall thickness can be achieved, which is to the further advantage of the saving in weight.

Besides this the invention has indeed been displayed and explained above by reference to some preferred design examples, but it is not restricted to these. On the contrary, many possibilities are open to the expert to adapt them by other combination of their features or replacement of the same against equivalent means, and indeed in particular also by other combinations of the displayed details of sectional shapes, to the relevant material and production engineering circumstances and/or to the requirements of the individual application, without departing because of this from the framework of the invention. Reference is made in particular to the fact that the fastening holes 27 for cross beams 33 and/or other additional units to be fastened to the band conveyor supporting frame 2 or the like in no ways need to be provided centrally in relation to the height of the supporting frame or of its longitudinal beam section 3 or 3a or 4 or 5 or 6 or 7 or 8 or 9 or 10 or 11 or 12 or 13 or 14 or 15 or 16 respectively and also they need not be provided in only one row, as is shown in FIG. 1 purely by way of example, but they can by all means be provided in another, preferably grid-like arrangement with higher or lower single rows of holes or two or more rows of holes with equal pitch and/or unequal pitch and/or vertically aligned or offset hole arrangement.

I claim:
1. A frame for a band conveying device comprising:
   a pair of adjacent longitudinal beams, each longitudinal beam being an inverted U-shape beam including a to web which is the base of the U-shape, a side web forming one leg of the U-shape and a connection flange forming the other leg of the U-shape, wherein said connection flange is of vertical extent relatively shorter than that of said side web, and wherein said connection flanges of said pair of longitudinal beams are positioned between said side webs of said longitudinal beams;
   a skid plate, said skid plate being an inverted U-shape piece, said skid plate including a central web which is the base of the U-shape and a pair of side webs which are the legs of the U-shape, and having said pair of side webs substantially parallel to said connection flange of each longitudinal beam, wherein said central web and said top webs of said pair of longitudinal beams are in the same plane;
   a cross beam separate from and located below and spaced from said skid plate, said cross beam adapted to connect and hold together said side webs of said pair of adjacent longitudinal beams, said cross beam having an extent in the direction of movement of the band of said conveying device substantially less than the respective extent of said skid plate; and
   means for connecting said cross beam to each of said side webs of said pair of adjacent longitudinal beams.

2. The frame according to claim 1, wherein said central web of said skid plate is arranged in alignment with said top webs of the two longitudinal beams and said side webs of said longitudinal beams extend downwards and away from said central web.

3. The frame according to claim 1, wherein said skid plate is formed as a C section.

4. The frame according to claim 1, wherein each of said pair of longitudinal beams is formed in several pieces over the length of said frame.

5. The frame according to claim 4, wherein said skid plate is formed as one part over substantially the entire length of said frame, and serves as a connection element for joining the several pieces of each of said pair of longitudinal beams.

6. The frame according to claim 4, wherein said skid plate is formed in several parts, each of said parts being arranged to overlap a joint of the joined several pieces of each of said pair of longitudinal beams to form connection elements.

7. The frame according to claim 1, wherein said connection means is a flange mounted on each of said pair of adjacent longitudinal beams.

8. The frame according to claim 1, wherein said cross beam is positioned in a direction vertical to said central web of said skid plate so as to support said skid plate.

9. The frame according to claim 1, wherein said side webs of said skid plate and said connection flange of each of said pair of longitudinal beams include a locating device, and wherein said side webs are cemented together.

10. The frame of claim 1, wherein each of said pair of longitudinal beams is formed of several pieces over the length of said frame, and wherein said skid plate is formed as one part over substantially the entire length of said frame and serves as a connection element for joining several pieces of each of said pair of longitudinal beams.

11. The frame of claim 1, wherein each of said pair of longitudinal beams is formed of several pieces over the length of said frame, and wherein said skid plate is formed of several parts with each of said parts being arranged to overlap a joint of the joined several pieces of each of said pair of longitudinal beams to form connection elements.

* * * * *